United States Patent [19]

Raghavachari

[11] Patent Number: 5,774,545
[45] Date of Patent: Jun. 30, 1998

[54] METHOD AND APPARATUS FOR ENHANCING SECURITY IN AND DISCOURAGING THEFT OF VLSI AND ULSI DEVICES

[75] Inventor: Partha Raghavachari, Chicago, Ill.

[73] Assignee: Lucent Technologies Inc., Murray Hill, N.J.

[21] Appl. No.: 623,271

[22] Filed: Mar. 28, 1996

[51] Int. Cl.[6] .................................................. H04L 9/00
[52] U.S. Cl. .............................................. 380/4; 380/23
[58] Field of Search ..................... 380/4, 23; 365/185.33

[56] References Cited

U.S. PATENT DOCUMENTS

4,926,480   5/1990   Chaum ...................................... 380/23
5,581,503  12/1996   Matsubara et al. ................. 365/185.33

Primary Examiner—Salvatore Cangialosi

[57] ABSTRACT

VLSI and ULSI devices like microprocessors and DRAM devices are prone to large scale theft from factories and warehouses. A proposed method of reducing the theft incorporates a small amount of non-volatile flash memory in these devices. The flash memory contains password, device serial number and user identification information. On power-up, the device initiates an encrypted password verification session through a standard interface. If the user supplied password fails, the device's operational ports (any data or control output buses) are tri-stated, thus making the device unusable. The device serial number and user identification information are useful in determining ownership of stolen devices when recovered.

25 Claims, 9 Drawing Sheets

METHOD AND APPARATUS FOR ENHANCING SECURITY IN AND DISCOURAGING THEFT OF VLSI AND ULSI DEVICES

FIELD OF THE INVENTION

This invention relates to integrated circuit devices, and more particularly to a method and apparatus for protecting large scale integrated devices from theft.

BACKGROUND OF THE INVENTION

Integrated circuit devices such as microprocessors and memory chips are becoming more and more powerful, and thus more complex. Such devices, which routinely contain circuits with millions of transistors, are classified as Very Large Scale Integrated (VLSI) or Ultra Large Scale Integrated (ULSI) devices. The cost of these devices depends on several factors including device complexity, usefulness, and demand. For example, high density Dynamic Random Access Memory (DRAM), which can reach capacity levels of 64 megabits in a single chip, can cost up to several hundred dollars per device.

A big problem faced by manufacturers of high priced microprocessor and memory devices is theft. Since these devices are so small in size, a large number can be easily stolen at one time. For example, a shoe box full of these devices, worth several thousand dollars, can be easily concealed and transported without notice. In fact, there have been numerous reports of armed gangs robbing such high-priced silicon devices from device manufacturers' foundries and warehouses. It is estimated that the monetary value of these losses runs into the tens of millions of dollars annually.

Heretofore, there are no known methods or devices that have been implemented to reduce or eliminate the theft associated with such large scale high-priced devices. Moreover, since the stolen devices do not contain serial numbers, their ownership is very difficult to trace and they are easily absorbed into the consuming market.

SUMMARY OF THE INVENTION

Accordingly, the present invention is directed to a method and apparatus for substantially reducing theft losses associated with large scale integrated devices, and providing a means for tracing ownership of stolen devices when recovered. To attain this, the present invention provides a built-in security mechanism that disables the functionality of the device until a random security challenge is met and a password is supplied upon device power up. In addition, the present invention provides a built-in ownership log that can be accessed upon meeting the random security challenge and supplying the password to trace ownership of that device. As a result, a device having the security mechanism of the present invention is rendered substantially useless to those who can not meet the random security challenge and supply the password, namely thieves.

In general, the built-in security mechanism provides a non-volatile facility (in the form of flash memory) for storing a reprogrammable password and other user information on the device. Moreover, upon each power-up of the device, the security mechanism provides a security clearance session that issues a random challenge to the external source or medium trying to access or use the device. As a result, unless the external source can meet the random challenge and supply the password, the device remains locked and thus unusable.

In one embodiment of the invention, the security mechanism also provides a built-in ownership log in the non-volatile memory facility. As a result, upon meeting the random challenge and supplying the password, the security mechanism enables the remote source to access and reprogram the user and manufacturer information, as well as reprogram the password. Moreover, since the ownership log maintains user information and manufacturer information between power-ups, the security mechanism can provide information that is useful to determine the owner of a stolen device, when recovered. Thus, the present invention overcomes, to a large extent, the limitations associated with the prior art.

These and other features of the invention are described in more complete detail in the following detailed description of embodiments of the invention when taken with the drawings. The scope of the invention, however, is limited only by the claims appended hereto.

DETAILED DESCRIPTION OF EMBODIMENTS OF THE INVENTION

Figure 1:
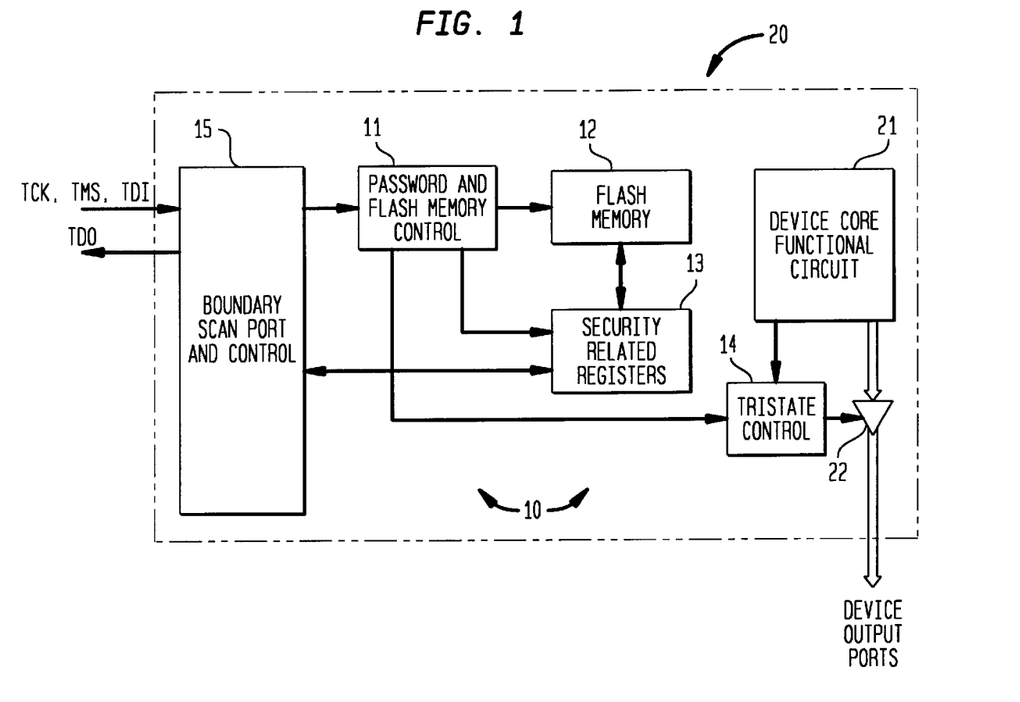
FIG. 1 is a block diagram of a device having one embodiment of the security mechanism of the present invention.

Referring now to FIG. 1 there is shown a large scale integrated device or device 20 having one embodiment of a built-in security mechanism 10 according to the present invention. As shown, security mechanism 10 has a password and flash memory control or controller 11 that is electrically connected to flash memory 12, security registers 13, tri-state control 14 and boundary scan port and control 15. Boundary scan port and control 15 is electrically connected to security registers 13 and an external interface (not shown). Flash memory 12 is electrically connected to security registers 13. Tri-state control 14 is electrically connected to the core functional circuit 21 of device 20 and device output ports 22. Core functional circuit 21 is the main feature of device 20. For example, core functional circuit 21 may be a microprocessor circuit or a DRAM memory circuit.

In operation, controller 11 interprets commands sent by the external medium (not shown), manages flash memory 12 and security registers 13, verifies the password supplied by the external medium for unlocking the device, supplies the external medium with data (device serial number, user identification information, etc.) after verifying the authenticity of the request for that data, and controls output ports 22 of core functional circuit 21 through tri-state logic 14. Flash memory 12 contains information such as password, device serial number, user identification information, random security challenge, security session status and failure information. Flash memory 12 provides the ability to save the stored information between power-ups and provides the ability to change the stored information without having to remove the memory from a system board, as required by EEPROM memory.

Controller 11 uses security registers 13 to perform its several functions as listed above. In addition, security registers 13 maintain portions of data stored in flash memory 12, and data required in an exchange between flash memory 12 and the external medium (not shown). Boundary scan port and control 15 facilitates dialog between the external medium (not shown) and the security mechanism 10 during a security clearance session. Basically, boundary scan port and control 15 provides an interface between an external medium (not shown) and controller 11. FIGS. 2–10 give a more detailed view of the above described functional parts of security mechanism 10.

Figure 2:
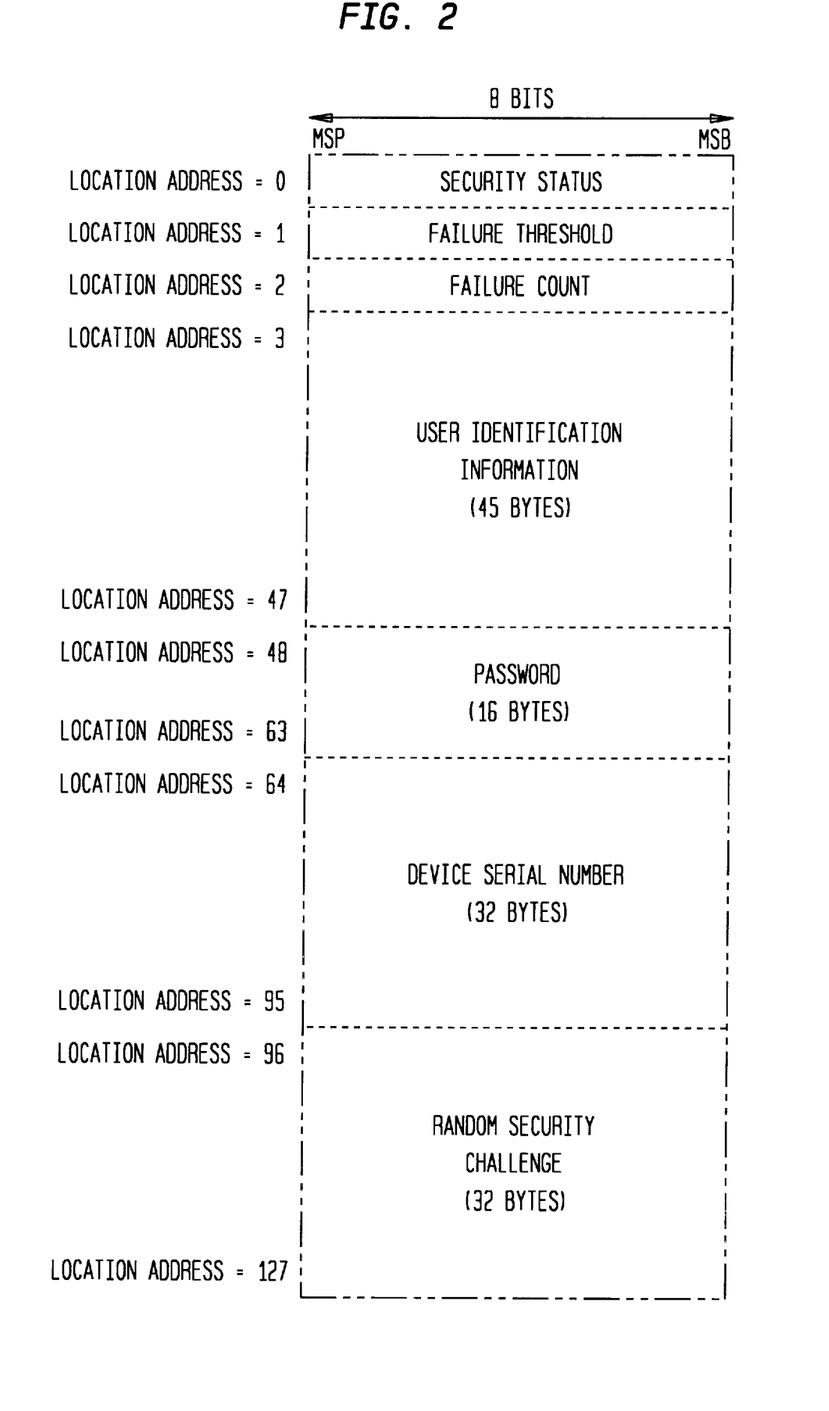
FIG. 2 is a pictorial view of the non-volatile flash memory organization of the embodiment shown in FIG. 1.

Referring now to FIG. 2 there is shown one embodiment of flash memory 12. As shown, flash memory 12 contains 128 bytes of data, wherein the default value of all the bits in an unprogrammed flash memory at the time of manufacture is a logic 1. Byte 0 of the flash memory 12 contains security status bits. The following diagram shows the layout of this byte:

Bit 0 tells controller 11 whether a super user access is needed to unlock device 20. This bit may be set when the number of failed unlocking attempts exceeds a failure threshold. Bit 1 tells controller 11 whether a password security session is needed to unlock device 20, and Bit 2 tells controller 11 whether a serial number has been programmed into device 20. Note that the unprogrammed values of these bits correspond to a security unprotected device.

The next byte, Byte 1, of flash memory 12 contains the security failure threshold value. As a result, the failure threshold value could be from 0 to 255. Thus, if this byte is programmed to a value k, controller 11 will permit up to k consecutive failed unlocking attempts before requiring a super user intervention. The next byte, Byte 2, of flash memory 12 contains the number of consecutive failed unlocking attempts. Thus, at the conclusion of a successful unlocking session, controller 11 resets this byte to a count of 0.

Bytes 3 through 47 are assigned to store user identification information. This could be the user's name, social security number, etc. This information may be represented using the ASCII character set which uses a byte of memory for each character. Thus, using the ASCII character set, the user identification information could contain up to 45 characters.

Bytes 48 through 63 contain the security password information. As a result, the password information is 128 bits wide. Bytes 64 through 95 are used for assigning a serial number to device 20. These 32 bytes could also be represented using the ASCII character set. And finally, bytes 96 through 127 contain the random security challenge. As described above, the contents of these 32 bytes for the random security challenge will be different for each power-up session of the security mechanism 10 in such a protected device 20.

Figure 3:
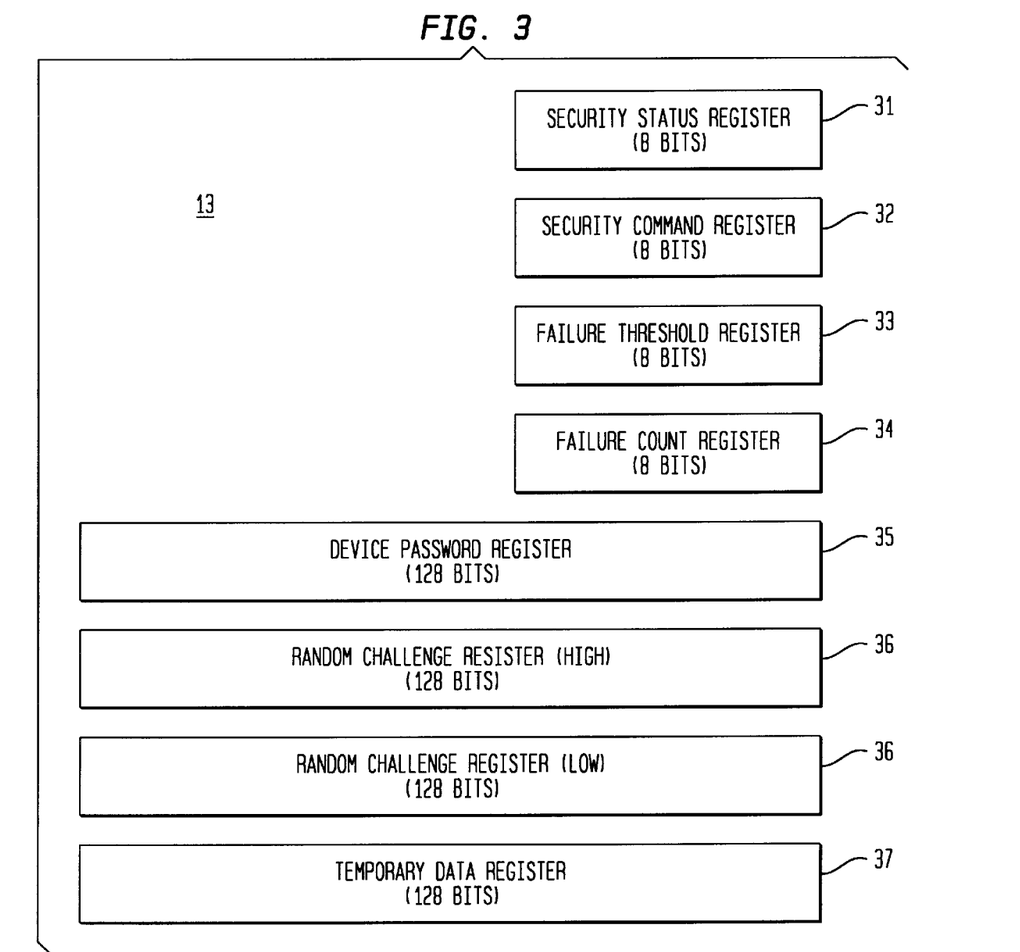
FIG. 3 is a block diagram of the security related registers of the embodiment shown in FIG. 1.

Referring now to FIG. 3 there is shown a block diagram of security registers 13. As shown, registers 13 are a collection of working registers. Controller 11 uses these registers to perform some of its various functions listed above. Security registers 13 include a status register 31 that contains status information about the security session. Status register 31 may be accessed in a read-only mode by the external medium (not shown). As a result, the external medium cannot modify the contents of register 31. Rather, controller 11 writes the different bits of register 31. The following diagram shows the layout of register 31:

Bits 0, 1 and 2 are the same as bits 0, 1 and 2 in byte 0 of flash memory 12. Bit 3 gives an indication of the pass/fail status of a password unlocking session to the external medium. Bit 4 indicates the pass/fail status of a session to modify the user identification information in flash memory 12. Bit 5 indicates the pass/fail status of a session needing a superuser to unlock device 20. Bit 6 indicates the pass/fail status of a session to change the user password in flash memory 12.

Bit 7 indicates the ready/busy status of controller 11. On power-up, bit 7 is reset to a value of logic 0. As a result, after power-up, controller 11 loads registers 13 from flash memory 12 sets Bit 7 to a logic 1, indicating its ready status. Thus, if controller 11 is busy, it will ignore any commands from the external medium requiring its attention. For instance, after a successful password session, the external medium may want to read the user identification information in the flash memory. Since, during this period, controller 11 takes time to access flash memory 12, the ready bit will be set to a logic 0. As a result, the external medium needs to read this bit to guarantee that the user identification information is valid.

Also shown in FIG. 3 is security command register 32. Command register 32 contains information about what action that external medium (not shown) desires of controller 11. The external medium writes these commands into register 32. The following table shows the commands supported thereby:

| security command register CR[7:0] (value in hex) | Definition |
| --- | --- |
| 00H | Idle/Reset |
| 01H | Password unlocking session request |
| 02H | Password change session request |
| 03H | Device serial number change session request |
| 04H | Failure threshold change session request |
| 05H | User identification information change session request |
| 06H | Device serial number (low) read session request |
| 07H | Device serial number (high) read session request |
| 08H | User identification information (one) read session request |
| 09H | User identification information (two) read session request |
| 0AH | User identification information (three) read session request |
| 0BH | Password security disable session request |
| 0CH through FFH | Reserved |

Also shown in FIG. 3 is failure threshold register 33 and failure count register 34. Failure threshold register 33 is identical to byte 1 in the flash memory, whereas failure count register 34 is loaded from byte 2 of flash memory 12 at the beginning of a power-up session as an initial failure count. Basically, the number of failed password unlocking attempts for the current session is added to the initial value in failure count register 34. As a result, every time register 34 is updated, byte 2 of flash memory 12 is also updated.

Also shown, is a device password register 35. Device password register 35 contains the 128 bits of password information. At the beginning of each power-up session, the contents of bytes 48 through 63 of flash memory 12 are copied into device password register 35 so that any successful modification of the password is also copied into register 35.

Figure 4:
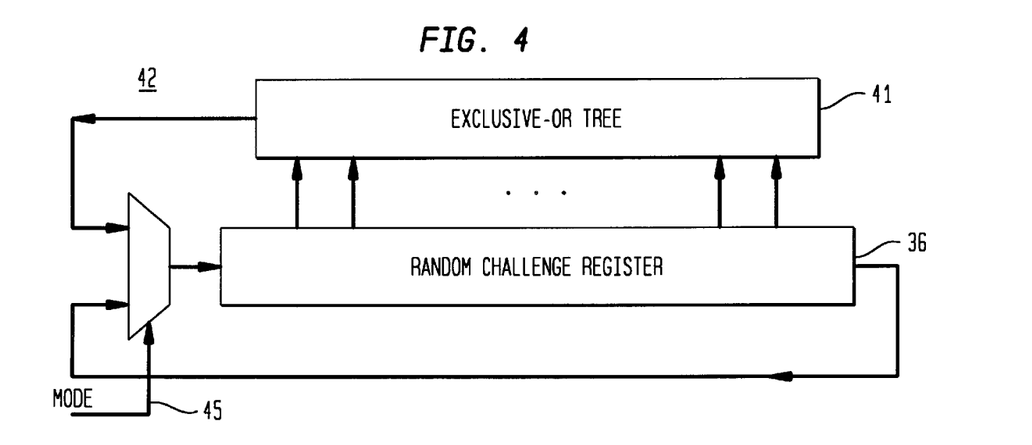
FIG. 4 is a block diagram of the random challenge registers of the embodiment shown in FIG. 1.

Also shown is random challenge register 36 which contains the random challenge information. Basically, at the beginning of each power-up session, the contents of bytes 96 through 127 of flash memory 12 are copied into register 36. As a result, each password unlocking session updates random challenge register 36. Thus, random challenge register 36 is essentially a Linear Feedback Shift Register (LFSR) which produces all possible bit patterns (except the all 0's bit pattern) before it repeats a pattern. This is achieved by tapping selected bit positions of register 36 and feeding them to an exclusive-OR tree 41 shown in FIG. 4. The output of tree 41 is fed back to the shift input of register 36. As shown in FIG. 4, random challenge register 36 has a circuit 42 that provides LSFR capability. In operation, mode control signal 45 determines if data is recirculated in register 36 or if a new bit pattern is loaded therein.

Finally, FIG. 3 shows a temporary data register 37 as part of security registers 13. Temporary data register 37 acts as a conduit between the external medium and flash memory 12. Basically, temporary data register 37 is used for updating password and user identification information in flash memory 12, and to read device 20's serial number and user identification information from flash memory 12.

Figure 5:
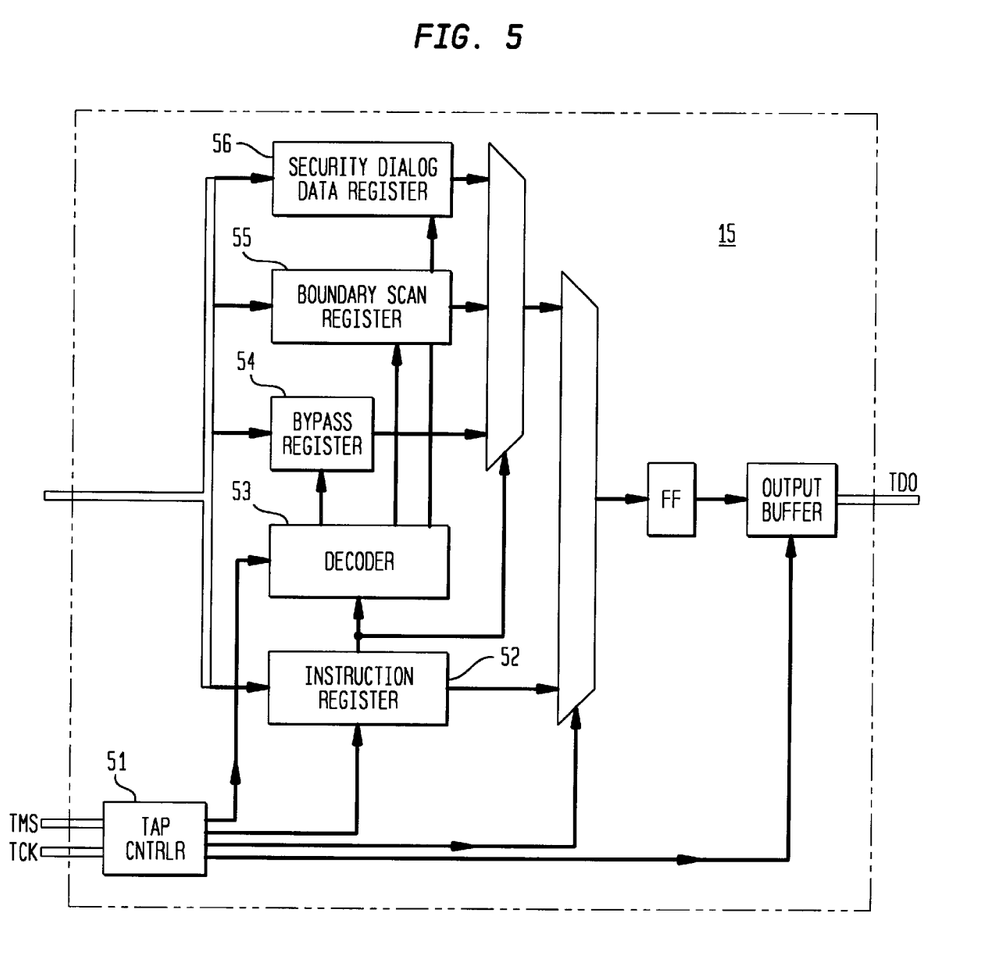
FIG. 5 is a block diagram of the boundary scan port of the embodiment shown in FIG. 1.

Referring now to FIG. 5, there is shown a block diagram of boundary scan port 15 containing a Test Access Port (TAP) controller 51, an instruction register 52, an instruction decoder 53, a device bypass register 54 and a boundary scan register 55 which are all required by the IEEE 1149.1 interface standard. An additional register, security dialog data register 56, provides secure dialog between the external medium (not shown) and device 20. Security dialog data register 56 is a 128 bit wide register which handles any data exchange between the external medium (not shown) and security registers 13, or between the external medium and flash memory 12.

Instruction register 52 controls the access of various registers in mechanism 10 during the boundary scan mode. Through the IEEE 1149.1 standard, this access requires a basic set of instructions including extest, sample and bypass. To facilitate the dialog between the external medium and security registers 13, however, some additional instructions have been defined. Namely, a boundary scan instruction register that is 5 bits wide is proposed with the following additional boundary scan instructions.

| Instruction Register IR[4:0] | Definition |
| --- | --- |
| 00000 | extest |
| 00001 | select bypass register |
| 0001x | sample |
| 00100 | write failure threshold register |
| 00101 | read failure threshold register |
| 00110 | read failure count register |
| 00111 | select bypass register |
| 01xxx | select bypass register |
| 10000 | read security status register |
| 10001 | write security command register |
| 10010 | read random security challenge register(low) |
| 10011 | read random security challenge register(high) |
| 10100 | write security password register |

-continued

| Instruction Register IR[4:0] | Definition |
| --- | --- |
| 10101 | write device serial number register(low) |
| 10110 | write device serial number register(high) |
| 10111 | read device serial number register |
| 11000 | select bypass register |
| 11001 | write user ID information register(one) |
| 11010 | write user ID information register(two) |
| 11011 | write user ID information register(three) |
| 11100 | read user ID information register |
| 11101 | select bypass register |
| 11110 | select bypass register |
| 11111 | select bypass register | note: x=don't care

Figure 6:
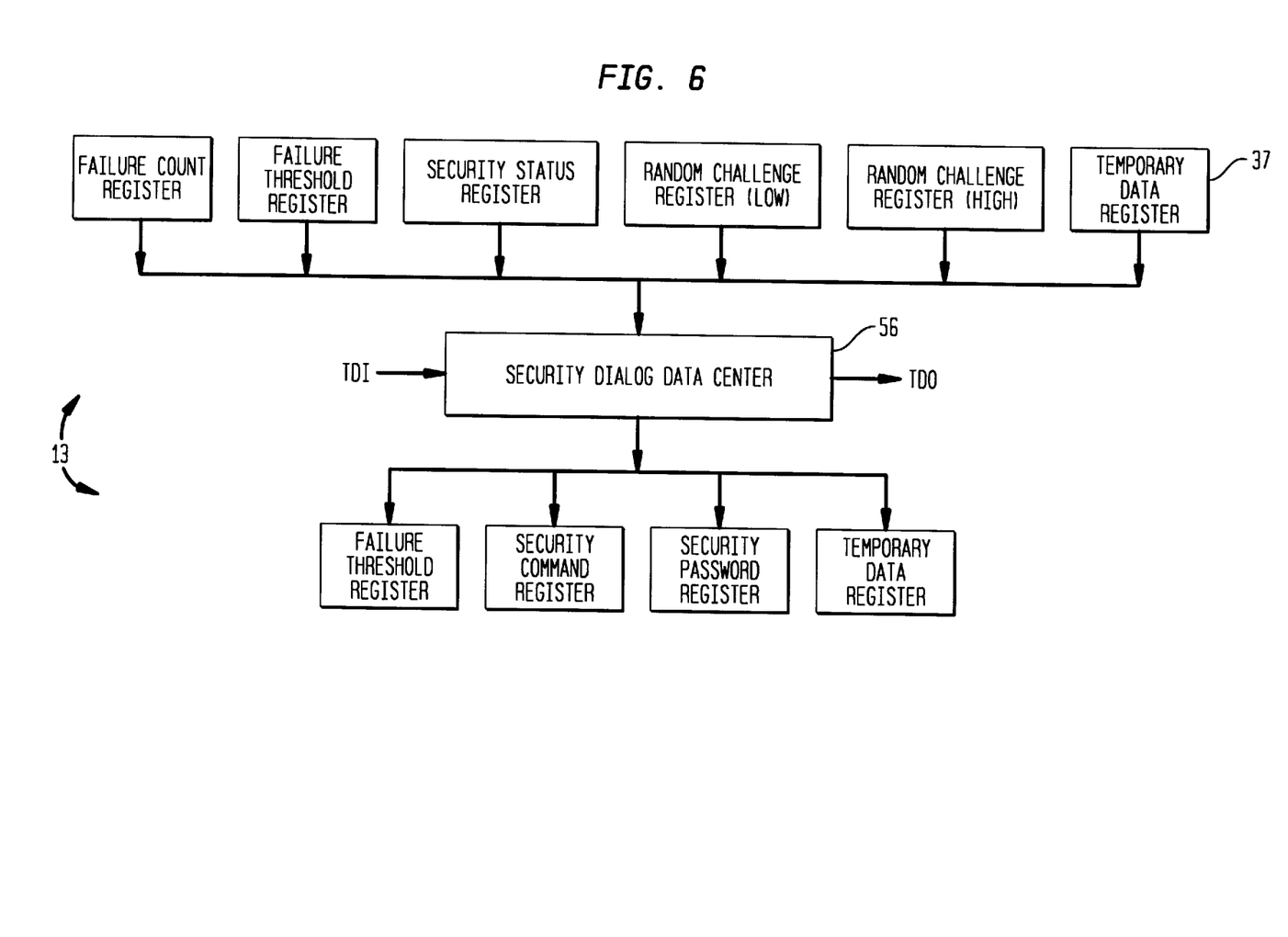
FIG. 6 is a block diagram of the interaction between security related registers and a security data dialog register of the embodiment shown in FIG. 1.

Referring now to FIG. 6, there is shown the interaction between security dialog data register 56 and security registers 13 that are necessary to implement the read and write instructions in the table above. Since the device serial number and user identification information are not always stored in security registers 13, they are stored in temporary data register 37 on demand. Thus, a write operation from the external medium to a device serial number register stores the data in temporary data register 37 from which it is transferred to flash memory 12. Similarly, a request by the external medium to read the user identification information causes a data transfer from flash memory 12 to temporary data register 37, from which the data is transferred to the external medium (not shown).

Figure 7:
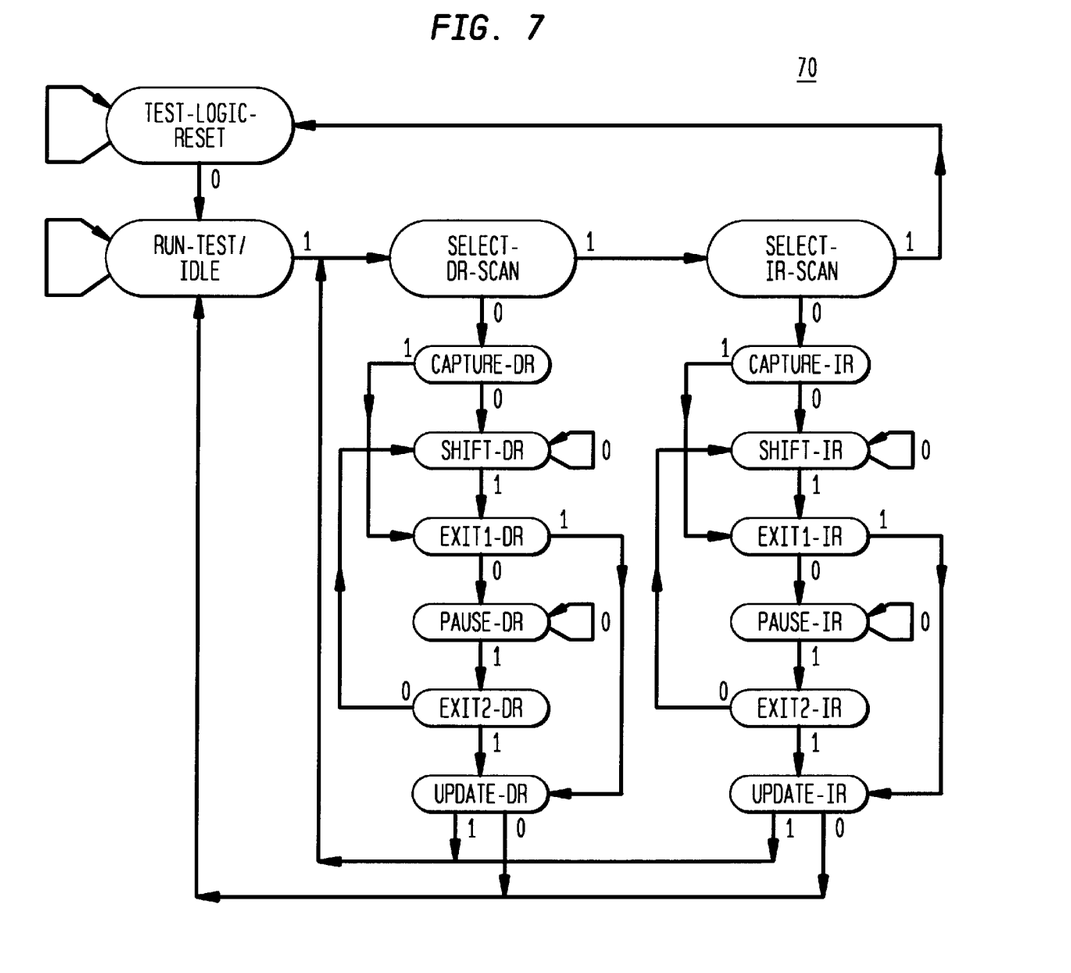
FIG. 7 is a state diagram of the test access port controller in the boundary scan port of the embodiment shown in FIG. 1.

Referring now to FIG. 7 there is shown one embodiment of Test Access Port (TAP) controller 70 in boundary scan port 15. As shown, FIG. 7 illustrates the operation of the read and write instructions during the boundary scan mode. To illustrate, consider the instruction "write security command register" (code 10001). To execute this instruction, the external medium has to follow these steps:

1. Put the TAP controller in the test-logic-reset state.
2. Traverse through the states (run-test-idle→select-DR-scan→select-IR-scan→capture-IR→shift-IR→exit1-IR→update-IR) to load the instruction register with the code 10001. The five bit code is shifted into the instruction register in the shift-IR state.
3. Traverse through the DR shift portion of the TAP controller to write the data in the security command register. This step requires traversing the states (select-DR-scan→capture-DR→shift-DR→exit1-DR→update-DR→run-test-idle). The eight bits of data to be written to the security command register are shifted in through the TDI lead in the shift-DR state. The least significant bit of data is shifted in first in this state.

In step 3, the data is shifted into the security dialog data register in the shift-DR state. In the update-DR state, the contents of the security dialog data register are transferred to the security command register. Note that the security dialog data register is chosen automatically during the DR shift states for all the read and write boundary scan instructions.

To compare instructions consider the instruction "read device serial number register" (code 10111). To execute this instruction, the external medium has to follow these steps:

1. Put the TAP controller in the test-logic-reset state.
2. Traverse through the states (run-test-idle→select-DR-scan→select-IR-scan→capture-IR→shift-IR→exit1-IR→update-IR) to load the instruction register with the code 10111. The five bit code is shifted into the instruction register in the shift-IR state.

3. Traverse through the DR shift portion of the TAP controller to read the device serial number register. This step requires traversing the states (select-DR-scan→capture-DR→shift-DR→exit1-DR→update-DR→run-test-idle). The thirty two bits of data to be read are loaded into the security dialog data register from the temporary data register in the capture-DR state. In the shift-DR state, the contents of the security dialog data register are shifted out through the TDO lead.

Figure 8:
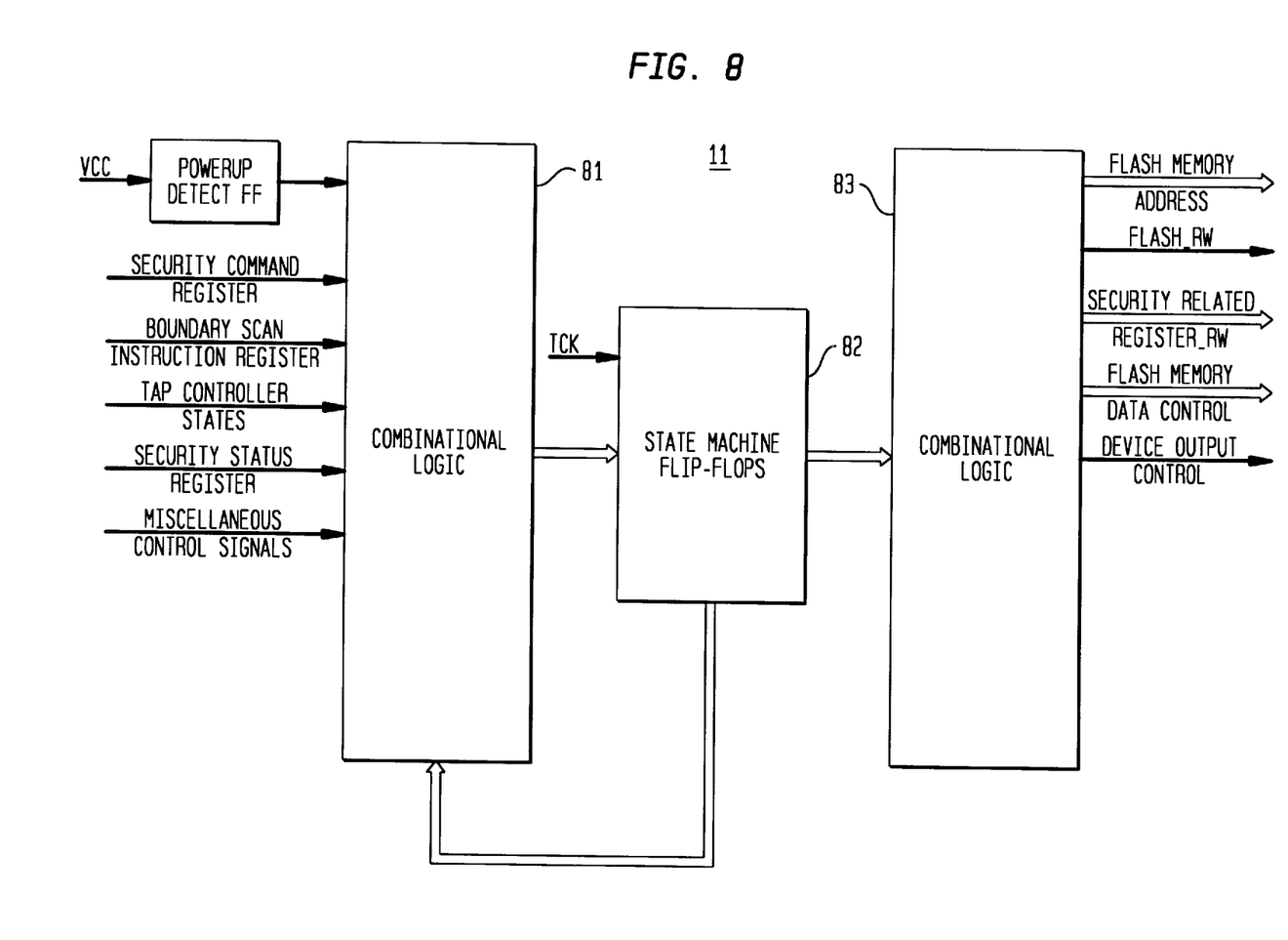
FIG. 8 is a block diagram of the password and non-volatile memory control circuit of the embodiment shown in FIG. 1.
Figure 9:
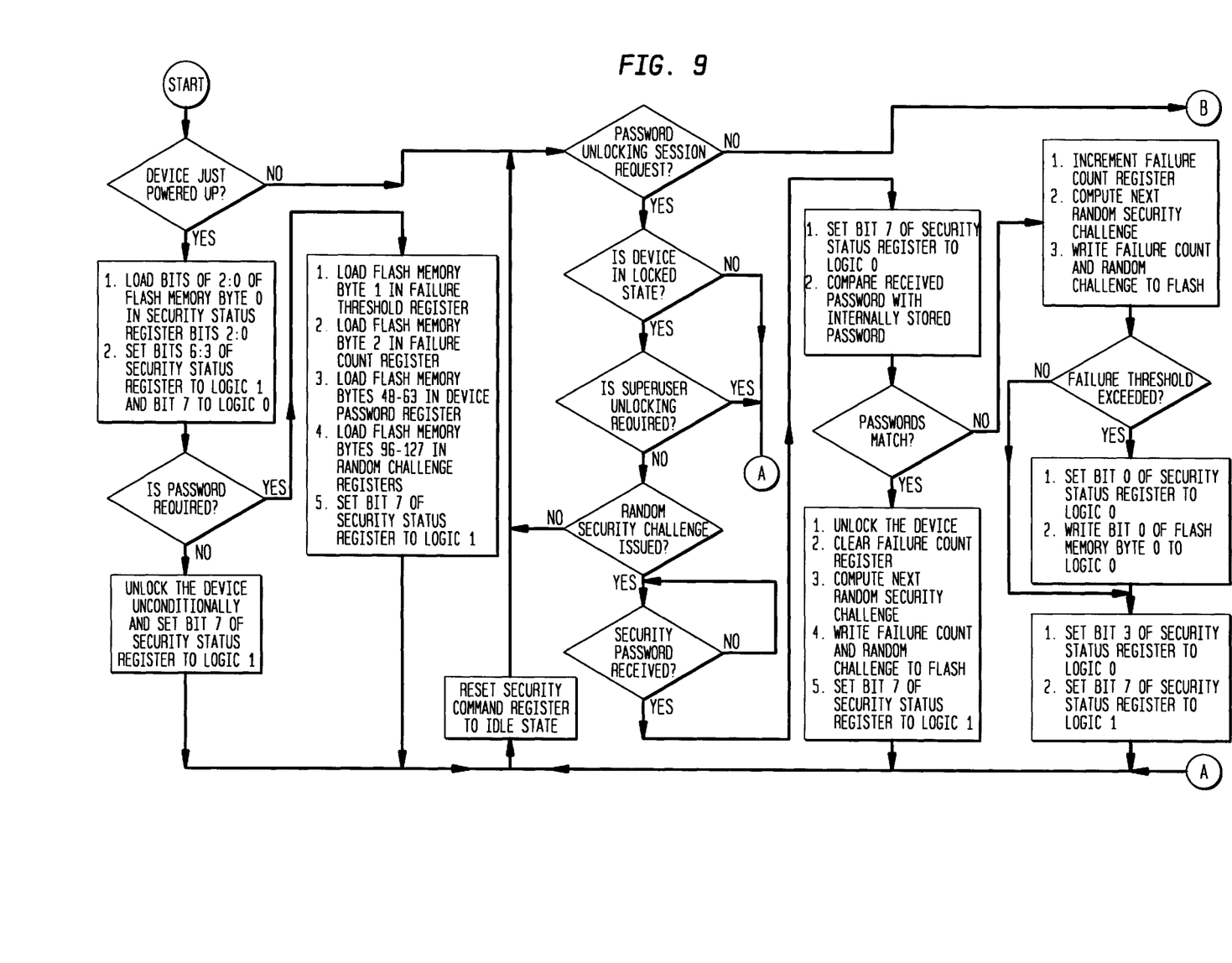
FIG. 9 is a flow chart of the controller circuit actions for various requests from the external medium.

Referring now to FIG. 8, there is shown a block diagram of one embodiment of controller 11. As shown, controller 11 has combination logic 81 electrically connected to state machine flip-flops 82 which, in turn is electrically connected to combination logic 83. From these devices, controller 11 decodes a request from the external medium in the security command register of registers 13, monitors the sequence of write and read operations of the external medium for each request, controls the address and data ports to the flash memory, controls the read and write operations of various security related registers, and controls the tri-state control of device output ports 22. FIG. 9 shows a detailed flow chart of the actions taken by controller 11 for various requests from the external medium.

Figure 10:
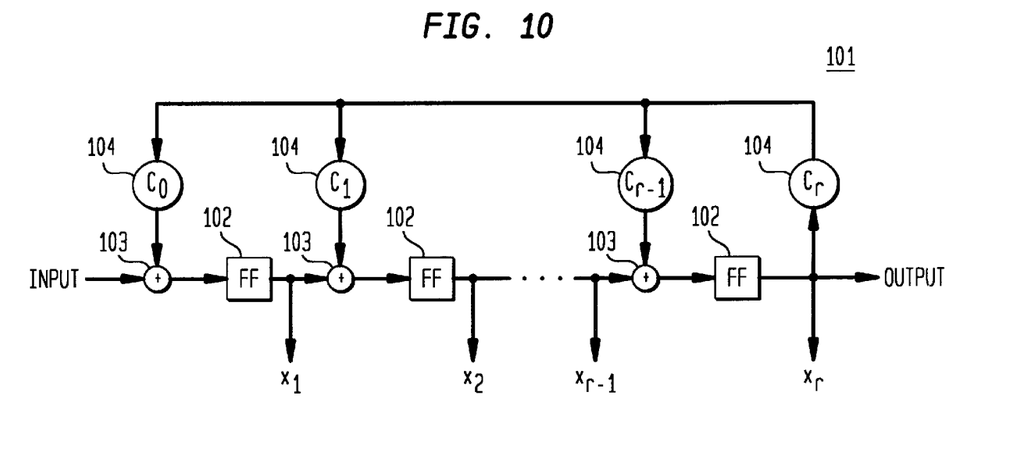
FIG. 10 is a block diagram of a linear feedback shift register that performs polynomial division.

As described above, during each security clearance session, the external medium needs to compute a function f(password, random challenge). To test the validity of the external medium's computation, controller 11 computes this same function. One way to implement this function is by using LFSR and polynomial division. A circuit for LFSR and polynomial division is illustrated in FIG. 10, herein after referred to as LFSR 101. As shown, LFSR 101 consists of flip-flops 102, exclusive-OR gates 103 and constant multipliers 104. For the constant 1, a connection is made for constant multipliers 104, whereas for the constant 0 there is no such connection. Since a serial input stream into LFSR 101 is a polynomial, LFSR 101 has its characteristic polynomial defined by the constants $C_0, C_1, \ldots, C_r$.

LFSR 101 divides any input polynomial by the characteristic polynomial and leaves the remainder in the circuit. If we assume the characteristic polynomial as being defined by the password and the input polynomial as being defined by the random challenge bit stream, then the remainder in the LFSR circuit 101 is the function f(password, random challenge). Some of the various algorithms for password unlocking, changing user identification information and reading the device serial number and user identification information is described below.

In operation, all actions during a security dialog session are initiated by the external medium. Thus, device 20 responds to these commands as a slave. The general sequence of events for various operations includes: (1) writing from the external medium to the security command register with a request to indicate the action desired of controller 11; and (2) stepping through a sequence of register read and write instructions defined in the boundary scan instruction register. The following table shows the sequence of events, in chronological order, between the external medium and controller 11 for various operations:

| External Medium Action | Device Password Control Action |
|---|---|
| Password Unlocking Session ||
| Read security status register to ensure device security control circuit is ready. | |
| Write security command register with a password unlock request. | |
| Read random security challenge register (low). | |
| Read random security challenge register (high). | |
| Compute f(password, challenge) and write it in security password register. | |
| | Compare contents of security password register with computed value. Indicate pass/fail status in security status register. Update random challenge, failure count, etc. |
| Read security status register to check password pass/fail status. | |
| Password Change Session ||
| Write security command register with a password change request. | |
| Execute a password unlocking session for existing password. ||
| Read security status register to ensure device security control circuit is ready. | |
| Read random security challenge register (low). | |
| Read random security challenge register (high). | |
| Compute f(password, challenge) and write it in security password register. | |
| | Compare contents of security password register with computed value. Indicate pass/fail status in security status register. Update random challenge, failure count, etc. |
| Change existing password ||
| Write security password register with new password. Write security password register a second time with new password. | |
| | Check for password consistency. Update device password register, failure count, flash memory, security status register, etc. |
| Read security status register to check password change pass/fail status. | |
| Device Serial Number Change Session ||
| Read security status register to ensure device security control circuit is ready. | |
| Write security command register with a serial number change request. | |
| Write device serial number register (low). | |
| | Write serial number register (low) to flash memory. |
| Read security status register to ensure device security control circuit is ready. | |
| Write device serial number register (high). | |
| | Write serial number register (high) to flash memory. Update flash memory and security status register. |

| External Medium Action | Device Password Control Action |
|---|---|
| Failure Threshold Change Session | |
| Write security command register with a failure threshold change request. | |
| | Execute a password unlocking session for existing password. |
| Read security status register to ensure device security control circuit is ready. Read random security challenge register (low). Read random security challenge register (high). Compute f(password, challenge) and write it in security password register. | |
| | Compare contents of security password register with computed value. Indicate pass/fail status in security status register. Update random challenge, failure count, etc. |
| | Change Failure Threshold |
| Write failure threshold register with new value. | |
| | Write new threshold value to flash memory. |
| User Identification Change Session | |
| Write security command register with a user ID change request. | |
| | Execute a password unlocking session for existing password. |
| Read security status register to ensure device security control circuit is ready. Read random security challenge register (low). Read random security challenge register (high). Compute f(password, challenge) and write it in security password register. | |
| | Compare contents of security password register with computed value. Indicate pass/fail status in security status register. Update random challenge, failure count, etc. |
| | Change User Identification |
| Write user ID information register (one). | |
| | Write user ID information register (one) to flash memory. |
| Read security status register to ensure device security control circuit is ready. Write user ID information register (two). | |
| | Write user ID information register (two) to flash memory. |
| Read security status register to ensure device security control circuit is ready. Write user ID information register (three). | |
| | Write user ID information register (three) to flash memory. Update flash memory and security status register. |
| Device Serial Number Read Session | |
| Write security command register with a device serial number read request. | |
| | Load device serial number (high or low) into temporary data register. |
| Read security status register to ensure device security control circuit is ready. Read device serial number register. | |
| | User Identification Read Session |
| Write security command register with a user ID read request. | |
| | Execute a password unlocking session for existing password. |
| Read security status register to ensure device security control circuit is ready. Read random security challenge register (low). Read random security challenge register (high). Compute f(password, challenge) and write it in security password register. | |
| | Compare contents of security password register with computed value. Indicate pass/fail status in security status register. Update random challenge, failure count, etc. |
| | Read User Identification |
| | Load user identification information (one or two or three) into temporary data register. |
| Read security status register to ensure device security control circuit is ready. Read user ID information register. | |
| | Password Security Disable Session |
| Write security command register with a password security disable request. | |
| | Execute a password unlocking session for existing password. |
| Read security status register to ensure device security control circuit is ready. Read random security challenge register (low). Read random security challenge register (high). Compute f(password, challenge) and write it in security password register. | |
| | Compare contents of security password register with computed value. Indicate pass/fail status in security status register. Update random challenge, failure count, etc. |
| | Disable Password Security |
| | Update flash memory and security status register. |

Note, the superuser unlocking session requires an unadvertised encoding (OCH to FFH) in the security command register. This encoding is known only to the device manufacturer. As a result, the superuser unlocking sequence is hardwired into device 20. For instance, the sequence may be a finite sequence of write operations containing definite data patterns to the security dialog data register. Thus, the superuser unlocking session may be performed by either the manufacturer or a third party working on behalf of the manufacturer.

What is claimed is:

1. A large scale integrated device having a core functional circuit and at least one output port, said device comprising:
   a security mechanism;
   a controller to control the operation of the security mechanism;
   a boundary scan port electrically coupled to said controller, said boundary scan port providing an interface between the security mechanism and an external medium;
   a flash memory electrically coupled to said controller, said flash memory providing the security mechanism with non-volatile storage of predetermined information and data;
   a set of security registers for providing functional support to said controller, said security registers electrically coupled to said flash memory, said controller and said boundary scan port; and
   tristate control logic for providing said controller with functional control over the core functional circuit and the output ports of the large scale integrated device, said tristate logic control electrically coupled to said controller, the core functional circuit and output ports of the device.

2. The device of claim 1 wherein said controller includes combinational logic and state machine flip-flops to interpret commands sent by said external medium, manage said flash memory and said security registers, verify passwords for unlocking the device, supply said external medium with said predetermined data, and control the output ports of the core functional circuit through said tristate logic.

3. The device of claim 1 wherein said flash memory provides 128 bytes of memory to store said predetermined information and data, each said byte being eight bits wide and having a separate location address, wherein the first byte is location address 0 and the last byte is location address 127.

4. The device of claim 3 wherein said predetermined information and data includes user identification information, a password, a device serial number, a random security challenge, security session status information, and failure information.

5. The device of claim 4 wherein said security status information is stored in location address 0, said failure information is stored in location addresses 1 and 2, said user identification is stored in location addresses 3–47, said password is stored in location addresses 48–63, said serial number is stored in location addresses 64–95, and said random security challenge is stored in location addresses 96–127.

6. The device of claim 4 wherein said random security challenge is a test, wherein said test requires said external medium to return a value at the beginning of each power-up of the device to unlock the device.

7. The device of claim 1 wherein said security registers include a security status register, a security command register, a failure threshold register, a failure count register, a device password register, a random challenge register, and a temporary data register.

8. The device of claim 1 wherein said boundary scan port further comprises a test access port controller, an instruction register, an instruction decoder, a device bypass register and a boundary scan register.

9. A built-in security mechanism for a large scale integrated device, the device having a core functional circuit and output ports, the security mechanism comprising:
   a controller to control the operation of the security mechanism;
   a boundary scan port electrically coupled to said controller, said boundary scan port providing an interface between the security mechanism and an external medium;
   a flash memory electrically coupled to said controller, said flash memory providing the security mechanism with non-volatile storage of predetermined information and data;
   a set of security registers for providing functional support to said controller, said security registers electrically coupled to said flash memory, said controller and said boundary scan port; and
   tristate control logic for providing said controller with functional control over the core functional circuit and the output ports of the large scale integrated device, said tristate logic control electrically coupled to said controller and the core functional circuit and output ports of the device to prevent unauthorized use thereof.

10. The device of claim 9 wherein said controller includes combinational logic and state machine flip-flops to interpret commands sent by said external medium, manage said flash memory and said security registers, verify passwords for unlocking the device, supply said external medium with said predetermined data, and control the output ports of the core functional circuit through said tristate logic.

11. The device of claim 10 wherein said flash memory provides 128 bytes of memory to store said predetermined information and data, each said byte being eight bits wide and having a separate location address, wherein the first byte is location address 0 and the last byte is location address 127.

12. The device of claim 11 wherein said predetermined information and data includes user identification information, a password, a device serial number, a random security challenge, security session status information, and failure information.

13. The device of claim 12 wherein said security status information is stored in location address 0, said failure information is stored in location addresses 1 and 2, said user identification is stored in location addresses 3–47, said password is stored in location addresses 48–63, said serial number is stored in location addresses 64–95, and said random security challenge is stored in location addresses 96–127.

14. The device of claim 12 wherein said random security challenge is a test, wherein said test requires said external medium to return a value at the beginning of each power-up of the device to unlock the device.

15. The device of claim 9 wherein said security registers include a security status register, a security command register, a failure threshold register, a failure count register, a device password register, a random challenge register, and a temporary data register.

16. The device of claim 15 wherein said boundary scan port further comprises a test access port controller, an instruction register, an instruction decoder, a device bypass register and a boundary scan register.

17. A method of protecting large scale integrated devices from theft, the large scale integrated devices having a core functional circuit and output ports, the method comprising the steps of:
   entering into a security session between a security mechanism and an external medium to protect unauthorized access to the core functional circuit and the output ports from said external medium; and controlling access to the core functional circuit and the output ports through tristate control logic by verifying a requested password from said external medium.

18. The method of claim 17 wherein said security session comprises the steps of:
   a. requesting the external medium to return a password upon each power-up of the device;
   b. comparing said returned password to a preprogrammed password in said security mechanism to determine if a password match exists therebetween.
   c. providing said external medium access to the device if said password match exists.

19. The method of claim 17 wherein said security session comprises the steps of:
   a. requesting the external medium to return a random challenge value upon each power-up of the device;
   b. comparing said returned random challenge value to a random challenge value calculated by said security mechanism to determine if a challenge value match exists therebetween;
   c. providing said external medium access to the device if said challenge value match exists.

20. The method of claim 19 wherein said random challenge value is a value calculated by both said external medium and said security mechanism from a set of random variables.

21. The method of claim 17 wherein said security session comprises the steps of:
   a. requesting the external medium to return a password and a random challenge value upon each power-up of the device;
   b. comparing said returned random challenge value to a random challenge value calculated by said security mechanism to determine if a challenge value match exists therebetween;
   c. comparing said returned password to a preprogrammed password in said security mechanism to determine if a password match exists therebetween;
   d. providing said external medium access to the device if both said challenge value match and said password match exist.

22. The method of claim 17 wherein said security mechanism enters into a device serial number change session if said external medium passes said security session.

23. The method of claim 17 wherein said security mechanism enters into a password change session if said external medium passes said security session.

24. The method of claim 17 wherein said security mechanism enters into a device serial number read session if said external medium passes said security session.

25. The method of claim 17 wherein said security mechanism enters into a failure threshold change session if said external medium passes said security session.

* * * * *